(12) United States Patent
Ushakov

(10) Patent No.: US 10,313,789 B2
(45) Date of Patent: Jun. 4, 2019

(54) ELECTRONIC DEVICE, ECHO SIGNAL CANCELLING METHOD THEREOF AND NON-TRANSITORY COMPUTER READABLE RECORDING MEDIUM

(71) Applicant: SAMSUNG ELECTRONICS CO., LTD., Suwon-si (KR)

(72) Inventor: Yury Ushakov, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/594,758

(22) Filed: May 15, 2017

(65) Prior Publication Data

US 2017/0365247 A1    Dec. 21, 2017

(30) Foreign Application Priority Data

Jun. 16, 2016    (KR) .................. 10-2016-0075165

(51) Int. Cl.
*H04R 3/02*    (2006.01)
*H04B 3/23*    (2006.01)
(Continued)

(52) U.S. Cl.
CPC ............. *H04R 3/02* (2013.01); *G10K 11/178* (2013.01); *H03H 21/0027* (2013.01);
(Continued)

(58) Field of Classification Search
CPC . H04B 3/23; H04B 3/237; H04R 3/02; H03H 21/0027; H03H 21/0043;
(Continued)

(56) References Cited

U.S. PATENT DOCUMENTS 6,031,908 A * 2/2000 Laberteaux ............. H04B 3/23
                                                    379/406.09
6,198,819 B1 * 3/2001 Farrell ................... H04B 3/234
                                                    370/286
(Continued)

FOREIGN PATENT DOCUMENTS

KR    1020120022101 A    3/2012
KR    1020160076059 A    6/2016

OTHER PUBLICATIONS

C. Avendano: "Acoustic Echo Suppression in the STFT Domain", IEEE Workshop on Applications of Signal Processing to Audio and Acoustics, Oct. 21-24, 2001, pp. 175-178 (4 pages total).
(Continued)

*Primary Examiner* — Lisa Hashem
(74) *Attorney, Agent, or Firm* — Sughrue Mion, PLLC

(57) ABSTRACT

An electronic device, an echo signal cancelling method thereof and a non-transitory computer readable recording medium is provided. The electronic device according to an exemplary embodiment includes a speaker configured to output a sound corresponding to a reference signal, a microphone configured to generate a microphone signal by obtaining a received sound, and a filter configured to cancel an echo signal of the reference signal from the microphone signal. In addition, the filter includes a first filter configured to estimate an echo signal of the reference signal and cancel the estimated echo signal from the microphone signal, and a second filter configured to generate an adaptive gain to cancel a residual echo from the microphone signal in which the estimated echo signal is canceled, and generate an output signal by using the generated adaptive gain and the microphone signal in which the estimated echo signal is canceled.

18 Claims, 9 Drawing Sheets

(51) Int. Cl.
*H03H 21/00* (2006.01)
*G10K 11/178* (2006.01)

(52) U.S. Cl.
CPC ......... *H03H 21/0043* (2013.01); *H04B 3/237* (2013.01); *G10K 2210/1082* (2013.01); *G10K 2210/3012* (2013.01); *G10K 2210/3213* (2013.01)

(58) Field of Classification Search
CPC ......... G10K 11/178; G10K 2210/1082; G10K 2210/3213; G10K 2210/3012
See application file for complete search history.

(56) References Cited

U.S. PATENT DOCUMENTS

| | | | | |
|---|---|---|---|---|
| 6,570,985 | B1* | 5/2003 | Romesburg | H04B 3/23 379/390.02 |
| 7,062,038 | B1* | 6/2006 | McLaughlin | H04B 3/23 379/406.08 |
| 7,747,001 | B2 | 6/2010 | Kellermann et al. | |
| 2008/0170706 | A1* | 7/2008 | Faller | H03G 9/005 381/59 |
| 2008/0192946 | A1* | 8/2008 | Faller | H04M 9/082 381/66 |
| 2010/0150360 | A1* | 6/2010 | Beaucoup | H04S 7/30 381/58 |
| 2011/0013781 | A1* | 1/2011 | Chhetri | H04M 9/082 381/66 |
| 2011/0019833 | A1* | 1/2011 | Kuech | H04M 9/082 381/66 |
| 2012/0308024 | A1* | 12/2012 | Alderson | G10K 11/178 381/71.11 |
| 2013/0230184 | A1* | 9/2013 | Kuech | H04M 9/085 381/66 |
| 2013/0301846 | A1 | 11/2013 | Alderson et al. | |
| 2016/0066087 | A1* | 3/2016 | Solbach | H04R 3/005 381/71.1 |
| 2016/0182770 | A1* | 6/2016 | Ushakov | H04N 7/15 348/14.03 |
| 2018/0040333 | A1* | 2/2018 | Wung | G10L 21/0232 |

OTHER PUBLICATIONS

C. Faller and J. Chen: "Suppressing Acoustic Echo in a Spectral Envelope Space", IEEE Transactions on Speech and Audio Processing, vol. 13, No. 5, Sep. 2005, pp. 1048-1062, (15 pages total).

Cohen and B. Berdugo: "Speech enhancement for non-stationary noise environments", Signal Processing 81 (2001) 2403-2418, (16 pages total).

A. Mader, H. Puder, and G.U. Schmidt: "Step-size control for acoustic echo cancellation filters—an overview", Signal Processing 80 (2000), pp. 1697-1719. (23 pages total).

* cited by examiner ed device, an echo signal cancelling method thereof and a non-transitory computer readable recording medium, and more particularly, to an electronic device capable of cancel-

ELECTRONIC DEVICE, ECHO SIGNAL CANCELLING METHOD THEREOF AND NON-TRANSITORY COMPUTER READABLE RECORDING MEDIUM

CROSS-REFERENCE TO RELATED APPLICATIONS

This application claims priority from Korean Patent Application No. 10-2016-0075165, filed on Jun. 16, 2016 in the Korean Intellectual Property Office, the disclosure of which is incorporated herein by reference in its entirety.

BACKGROUND

Field

Aspects of the exemplary embodiments relate to an electronic device, an echo signal cancelling method thereof and a non-transitory computer readable recording medium, and more particularly, to an electronic device capable of cancelling a residual echo additionally from a signal in which an echo is canceled through an adaptive filter firstly, an echo signal cancelling method thereof and a non-transitory computer readable recording medium.

Description of the Related Art

With respect to an electronic device such as a communication terminal, a voice of a far-end speaker is echoed by a surrounding environment and input through a near-end microphone. The phenomenon that the sound produced by a device is input to the device again is called an acoustic echo.

Recently, the development of the electronic device which operates by recognizing a voice has been increased. In addition, many display devices such as a smart TV often include a microphone to perform a voice recognition function. Accordingly, there is a growing need to develop a method to cancel an acoustic echo, which is available not only for a communication terminal but for electronic devices in a variety of fields.

There is an increasing necessity of a method to cancel an echo without using phase information because a vibration of an air pressure according to a speaker positioned near a microphone causes a confusion on a phase of a signal. According to the necessity, the method to convert a signal to a frequency domain has been developed, however, the efficiency of an adaptive filter is still low because of a use of a complex coefficient.

In addition, a residual echo still exists even after a sound is processed by the adaptive filter. Further, a dispersion value of a noise required for cancelling the residual echo may not be estimated appropriately.

SUMMARY

An aspect of the exemplary embodiment has been made to address the problems described above and to provide an electronic device capable of cancelling an echo with an adaptive filter (AF) and cancelling a residual echo with a residual echo suppressor (RES), an echo signal cancelling method thereof and a non-transitory computer readable recording medium.

According to an exemplary embodiment, there is provided an electronic device including a speaker configured to output a sound corresponding to a reference signal, a microphone configured to generate a microphone signal by obtaining a received sound and a filter configured to cancel an echo signal of the reference signal from the microphone signal, and the filter includes the first filter configured to estimate an echo signal of the reference signal and cancel the estimated echo signal from the microphone signal and the second filter configured to generate an adaptive gain to cancel a residual echo from the microphone signal in which the estimated echo signal is canceled, and generate an output signal by using the generated adaptive gain and the microphone signal in which the estimated echo signal is canceled.

According to an exemplary embodiment, there is provided an echo signal cancelling method of an electronic device including generating a microphone signal by obtaining a sound received by the electronic device, estimating an echo signal of a reference signal which is output from the electronic device and cancelling the estimated echo signal from the microphone signal, generating an adaptive gain to cancel a residual echo from the microphone signal in which the estimated echo signal is canceled and generating an output signal by using the generated adaptive gain and the microphone signal in which the estimated echo signal is canceled.

According to an exemplary embodiment, there is provided a non-transitory computer readable recording medium comprising a program to execute an echo signal cancelling method of an electronic device, the method including generating a microphone signal by obtaining a sound received by the electronic device, estimating an echo signal of a reference signal which is output from the electronic device and cancelling the estimated echo signal from the microphone signal, generating an adaptive gain to cancel a residual echo from the microphone signal in which the estimated echo signal is canceled, and generating an output signal by using the generated adaptive gain and the microphone signal in which the estimated echo signal is canceled.

According to yet another exemplary embodiment, an electronic device includes: a speaker configured to output a sound corresponding to a reference signal; a microphone configured to generate a microphone signal by obtaining the sound corresponding to the reference signal; and a filter configured to cancel an echo signal of the reference signal from the microphone signal, in which the filter includes: a first filter configured to estimate the echo signal of the reference signal and to cancel the estimated echo signal from the microphone signal; and a second filter configured to generate an adaptive gain to cancel a residual echo from the microphone signal in which the estimated echo signal is canceled, and generate an output signal by using the generated adaptive gain and the microphone signal, in which the estimated echo signal is canceled.

As described above, according to the diverse exemplary embodiments, the electronic device may cancel an echo signal occurred from the signal which is output from the electronic device itself, in two stages. In addition, the electronic device may cancel a residual echo by estimating an appropriate dispersion value of the residual echo.

DETAILED DESCRIPTION

Hereinafter, exemplary embodiments are described in detail with reference to the accompanying drawings. In describing the exemplary embodiments, well-known element structures and technologies are not described in detail since they would obscure the exemplary embodiments in unnecessary detail. Further, all terms used in the description are general terms that are widely used in consideration of their functions in the exemplary embodiments, but may differ depending on intentions of a person skilled in the art to which the exemplary embodiments belong, custom, or appearance of new technology. Accordingly, they should be defined on the basis of the contents of the whole description of the exemplary embodiments.

The term such as "first" and "second" used in various exemplary embodiments may modify various elements regardless of an order and/or importance of the corresponding elements, and does not limit the corresponding elements. The terms are used only to distinguish one element from other elements. For example, a first element may be named a second element without departing from the scope of right of various exemplary embodiments, and similarly, a second element may be named a first element. The term of and/or includes combination or one of a plurality of related items recited.

The terms used herein are solely intended to explain a specific exemplary embodiment, and not to limit the scope of the present disclosure. A singular expression includes a plural expression, unless otherwise specified. The terms, "include", "comprise", etc. of the description are used to indicate that there are features, numbers, operations, elements, parts or combination thereof, and they should not exclude the possibilities of combination or addition of one or more features, numbers, operations, elements, parts or combination thereof.

Figure 1:
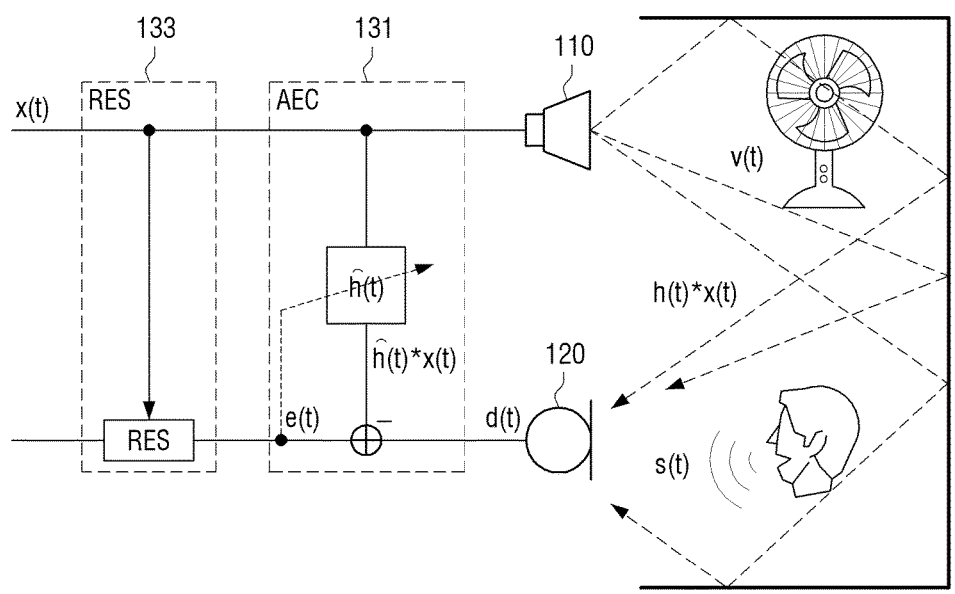
FIG. 1 is a conceptual diagram of an electronic device according to an exemplary embodiment.

FIG. 1 is a conceptual diagram provided to explain the electronic device 100 according to an exemplary embodiment. The electronic device 100 according to an exemplary embodiment may be all kinds of devices including a strong speaker and a microphone placed at a close range. For example, the electronic device 100 may be realized as a device transmitting and receiving a voice signal such as a communication terminal. In addition, an electronic device 100 may be realized as a device capable of performing a voice controlling function such as a smartphone, a smart TV, a desktop, an audio device, an interactive voice recognition device, and a navigation device. The electronic apparatus 100 also may be realized as an IoT herb device which operates by a voice control. A microphone 120 receiving a voice of a user and a speaker 110 outputting a voice to the user are placed near the above devices, and thus an echo signal cancelling method according to an exemplary embodiment may be applied to the devices.

Referring to FIG. 1, the electronic device 100 may output a sound through the speaker 110. The sound output from the speaker 110 corresponds to a signal generated from the electronic device 100. The signal which is generated from the electronic device 100 and which will be output through the speaker 110 will be called a reference signal. In FIG. 1, the reference signal is recited as x(t).

The electronic device 100 may receive an utterance of a user s(t) through the microphone 120. However, the microphone 120 receives not only an utterance of a user but an echo signal of the reference signal h(t)*x(t), which is output from the speaker 110. The microphone 120 may generate a microphone signal d(t) by obtaining the received sound.

A purpose of the electronic device 100 according to an exemplary embodiment is to cancel the echo signal of the reference signal h(t)*x(t) from the microphone signal d(t) and obtain the signal of a near-end speaker s(t) only. Referring to FIG. 1, the electronic device 100 may cancel the echo signal of the reference signal by using a first filter 131 or an acoustic echo canceller (AEC), and a second filter 133 or a residual echo suppressor (RES).

According to the above, the electronic device 100 according to an exemplary embodiment may obtain a signal of a near-end speaker which is aimed to be received by cancelling the echo signal in two stages. The echo signal cancelling method in two stages will be described below in detail.

Figure 2:
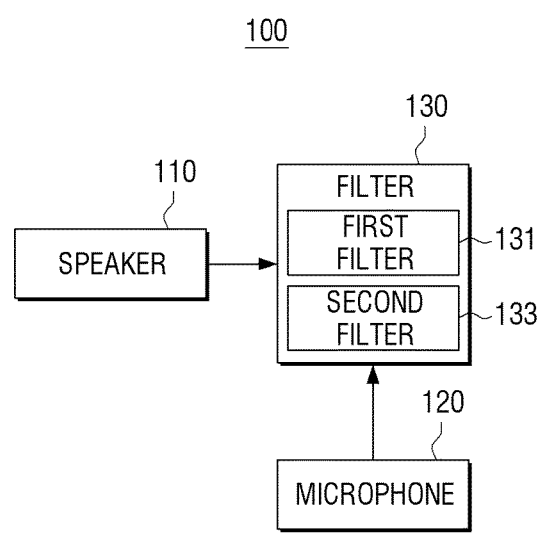
FIG. 2 is a block diagram provided to explain roughly a composition of an electronic device according to an exemplary embodiment.

FIG. 2 is a block diagram provided to explain roughly a composition of the electronic device 100 according to an exemplary embodiment. Referring to FIG. 2, the electronic device 100 may include a speaker 110, a microphone 120 and a filter 130. The filter 130 may include a first filter 131 and a second filter 133.

The speaker 110 may output a sound. For example, the speaker 110 may output the sound corresponding to a reference signal by processing the reference signal (or an audio signal).

The microphone 120 may obtain a sound around the electronic device 100. In addition, the microphone 120 may generate a microphone signal (or an audio signal) by processing the obtained sound.

The filter 130 may cancel an echo signal of the reference signal from the microphone signal. The filter 130 may be composed of circuits performing respective functions and may perform a signal processing by using CPU, DSP and the like.

The filter 130 may include the first filter 131 which cancels an acoustic echo signal output from the speaker 110 by using an adaptive filter (AF), and the second filter 133 which cancels a residual echo which remains even after the processing of the first filter 131.

In addition, the filter 130 may further include compositions such as a converter 134 which converts a signal into a frequency domain, a magnitude obtainer 135 which obtains a spectral magnitude from the signal converted into the frequency domain, a phase obtainer 136 which obtains a phase from the signal converted into the frequency domain, an inverter 137 which converts a signal into a time domain, and a synthesizer 138 which synthesizes the magnitude and the phase.

All the compositions performing respective functions in the above may be included in the filter 130, or some of the functions may be performed in an additional composition.

The first filter 131 may estimate the echo signal of the reference signal and cancel the echo signal of the reference signal which is estimated from the microphone signal. The first filter 131 may be called an acoustic echo canceller (AEC).

For example, the first filter 131 may generate an estimated echo signal which traces the echo signal of the reference signal by renewing an adaptive filter (AF) coefficient. The first filter 131 may cancel a noise occurred by a voice signal of the electronic device 100 itself by cancelling the estimated echo signal generated by the microphone signal.

The first filter 131 may update an echo signal which is estimated successively to trace the echo signal of the reference signal. The signal which goes through the first filter 131 and in which the echo signal of the reference signal estimated from the microphone signal is canceled is called an error signal. For example, if the estimation is perfect, the estimated echo signal may coincide with an actual echo signal of the reference signal. However, the estimation may not be perfect in a practical operation, and thus the error signal which went through the first filter 131 may include a residual echo.

The second filter 133 may generate an output signal by cancelling a residual echo from the microphone signal (that is, the error signal) in which the estimated echo signal is canceled. For example, the second filter 133 may generate an adaptive gain to cancel the residual echo from the microphone signal in which the estimated echo signal is canceled. In addition, the second filter 133 may generate an output signal by using the microphone signal in which the generated adaptive gain and the estimated echo signal are canceled. A specific operation of the second filter 133 will be described below again.

Figure 3:
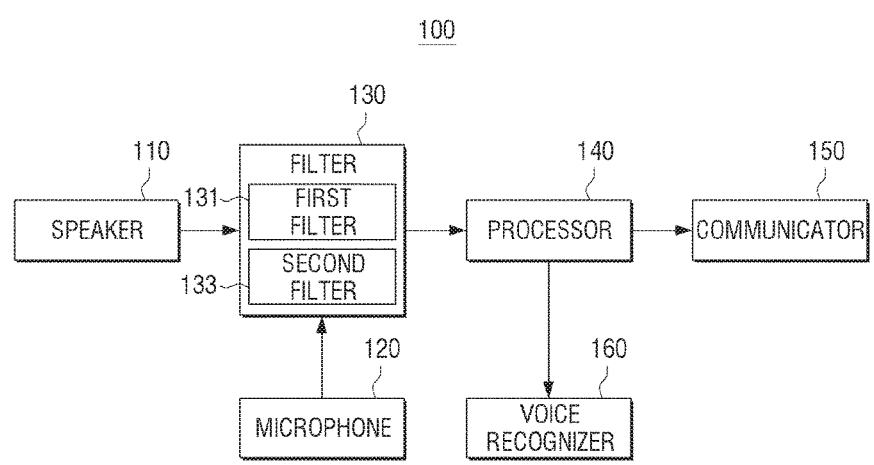
FIG. 3 is a block diagram provided to explain a composition of an electronic device according to an exemplary embodiment.

FIG. 3 is a block diagram provided to explain a composition of the electronic device 100 according to an exemplary embodiment. The electronic device 100 may include additional compositions such as the speaker 110, the microphone 120, the filter 130, a processor 140, a communicator 150 and a voice recognizer 160. In addition to the compositions illustrated in an exemplary embodiment of FIG. 3, additional compositions may be included according to an exemplary embodiment of the electronic device 100.

The processor 140 may control an overall composition of the electronic device 100. An exemplary embodiment of FIG. 3 illustrates that the output signal generated in the filter 130 goes through the processor 140 and is transmitted to the communicator 150 or the voice recognizer 160. However, the output signal may be transmitted directly to the composition such as the communicator 150.

The communicator 150 may transmit the output signal which is generated through the filter 130 to an external device. For example, if the electronic device 100 is realized as a smartphone and performs a phone call on a speaker phone mode, the communicator 150 may cancel an echo signal of a voice of a person at the other end of the line which is output from the speaker 110, and transmit the output signal in which the voice of the user only remains, to the device of the person at the other end of the line.

The communicator 150 may communicate with an external device through a wired and wireless network. For example, the communicator 150 may include a variety of communication modules such as a near-field wireless communication module (not illustrated) and a wireless communication module (not illustrated). Herein, the near-field wireless communication module refers to the module which communicates with an external device located nearly, according to a near-field wireless communication method such as Bluetooth, Zigbee and the like. In addition, the wireless communication module refers to the module which is connected to an external network according to a wireless communication protocol such as WiFi, IEEE and the like, and performs a communication. In addition to the above, the wireless communication module may further include a mobile communication module which accesses a mobile communication network according to a variety of mobile communication standards such as 3rd generation (3G), 3rd Generation Partnership Project (3GPP), Long Term Evolution (LTE) and LTE Advanced (LTE-A) and which performs a communication.

The communicator 150 may let the voice recognizer 160 to communicate with an external server and the like. For example, the communicator 150 may transmit a result of a voice recognition which is processed in the voice recognizer 160 to an external server, and receive corresponding information from an external device.

The voice recognizer 160 may perform a voice recognition by using an output signal generated in the filter 130. The voice recognizer 160 may generate a control signal capable of controlling the electronic device 100 itself or an external device according to the result of the voice recognition.

For example, the voice recognizer 160 may detect and recognize a trigger word from the generated output signal and generate a result of a word and a sentence voice recognition from an output signal after the trigger word is recognized.

Figure 4:
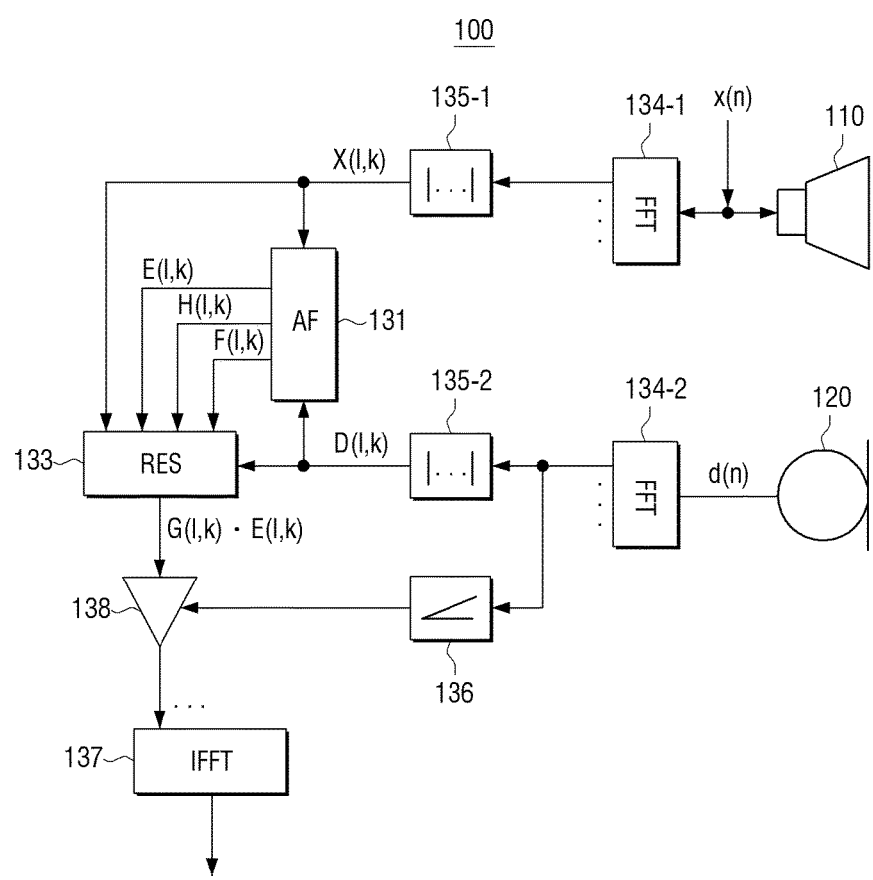
FIG. 4 is a drawing provided to explain a process of cancelling an echo signal of an electronic device according to an exemplary embodiment.

FIG. 4 is a drawing provided to explain a process of cancelling the echo signal of the electronic device 100 according to an exemplary embodiment.

In the exemplary embodiment of FIG. 4, x(n) refers to a reference signal. The reference signal generated in the electronic device 100 may be output as a sound corresponding to the reference signal through the speaker 110. In addition, the reference signal may be input in the filter 130 and used to cancel an echo signal of the reference signal.

The microphone 120 may obtain a received sound and generate a microphone signal d(n). The microphone signal d(n) may include the echo signal of the reference signal. The filter 130 may perform an operation to cancel the echo signal of the reference signal included in the microphone signal. The electronic device 100 may preserve a voice signal of a near-end speaker by cancelling the echo signal of the reference signal.

The converter 134-1 and 134-2 may convert the reference signal x(n) and the microphone signal d(n) into a frequency domain respectively. In addition, the filter 130 may divide each of the microphone signal and the reference signal, which are converted into the frequency domain, into a magnitude and a phase. The magnitude obtainer 135-1 and 135-2 may respectively receive the microphone signal and the reference signal which are converted into the frequency domain, and obtain the magnitude only. The signal in which the phase is canceled and only the magnitude remains may be called spectral magnitude. The electronic device 100 according to an exemplary embodiment may solve a problem such as a release of an estimated value occurred due to a rapid change of a phase, by using the signal which is converted into a frequency domain and also of which phase is divided and only the magnitude remains. In addition, the phase obtainer 136 may receive the microphone signal converted into the frequency domain and obtain the phase only.

An exemplary embodiment of FIG. 4 illustrates that the converter 134 converts the reference signal and the microphone signal into a frequency domain by using fast Fourier transform (FFT). l is a FFT frame index, and k is a frequency component index. However, the method that the electronic device 100 converts signals into the frequency domain may not be limited to FFT. For example, the converter 134 may use a method such as Short Time Fourier Transform (STFT).

It may be more appropriate to use the method STFT than using the method FFT to prevent a signal distortion.

The first filter 131 may receive a spectrum magnitude of the converted reference signal, X(l,k), and a spectrum magnitude of the microphone signal, D(l,k). The first filter 131 or AEC may include a plurality of adaptive filters which operate in different frequency domains. Each of the plurality of adaptive filters may generate an estimated echo signal of frequency domains assigned respectively. Such AEC is called sub band AEC.

The first filter 131 may trace an echo signal of a reference signal while updating adaptive filter coefficient H(l,k). The first filter 131 generates an estimated echo signal of the reference signal F(l,k), by multiplying a reference signal of a previous time frame by an adaptive filter coefficient of a present time frame. In addition, the first filter 131 may cancel the echo signal of a reference signal estimated in a microphone signal. The signal that an echo signal estimated in the microphone signal is canceled is called error signal E(l,k). A detailed operation of the first filter 131 may be explained again in FIG. 6.

The second filter 133 may generate adaptive gain G(l,k) to cancel a residual echo from the microphone signal in which the estimated echo signal is canceled (that is, the error signal E(l,k)). The error signal E(l,k) may include both the residual echo and a voice signal of a near-end speaker. If the adaptive gain is multiplied by the error signal, only the voice signal of the near-end speaker is output. That is, the relation of the error signal and the adaptive gain is as follows.

$$E = \text{Signal} + \text{Noise}, G \cdot E = \text{Signal}$$

The second filter 133 may estimate a dispersion value of the residual echo and generate the adaptive gain by using all frequency components of the dispersion value of the estimated residual echo and the error signal (the microphone signal in which an echo signal estimated in the first filter 131 is canceled). The second filter 133 may generate an adaptive gain by using one or more frequency components of the microphone signal in which the estimated echo signal is canceled. A detailed operation of the second filter 133 may be explained again in FIG. 7.

The synthesizer 138 may synthesize a spectrum magnitude that the error signal is multiplied by the adaptive gain, with a phase of the microphone signal. In addition, the inverter 137 may convert the synthesized signal into a time domain.

Figure 5:
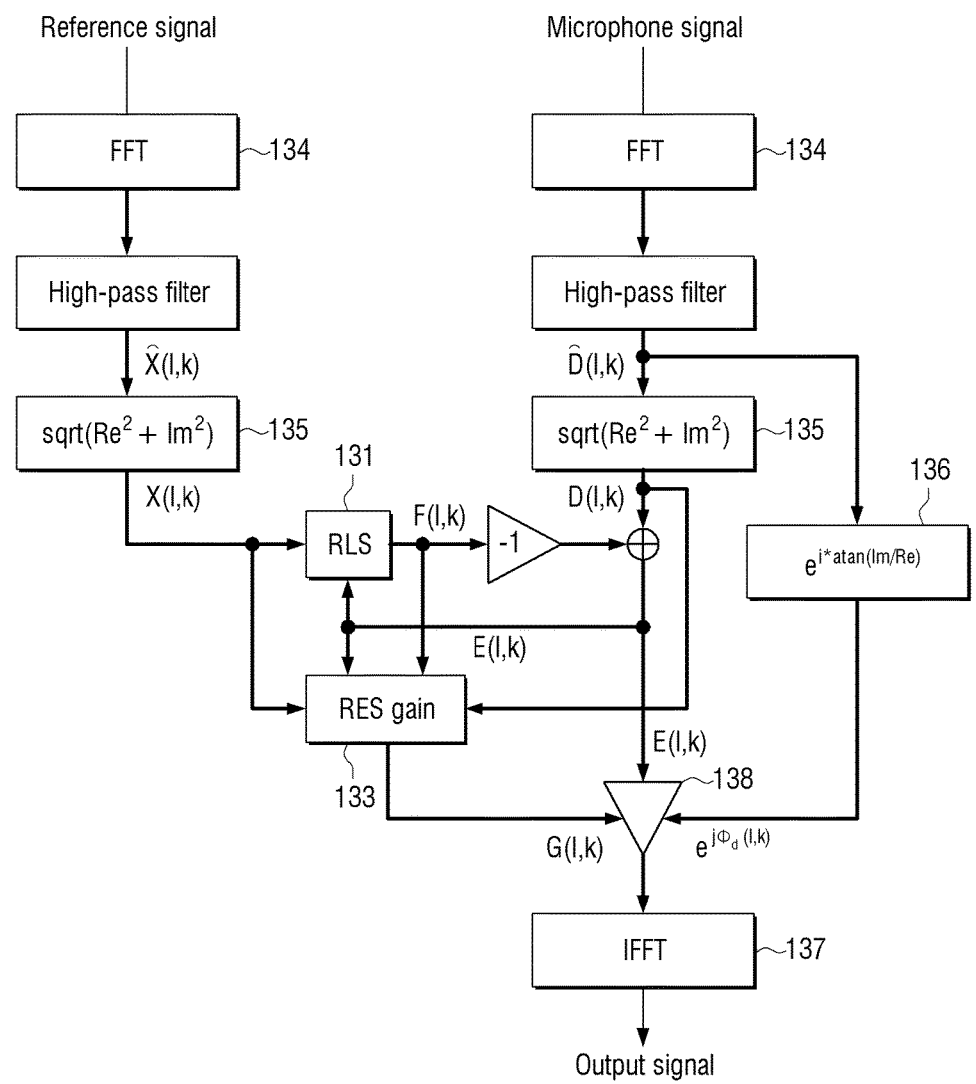
FIG. 5 is a drawing provided to explain an echo signal cancelling method of an electronic device by a functional block according to an exemplary embodiment.

FIG. 5 is a drawing provided to explain an echo signal cancelling method of the electronic device 100 by a functional block according to an exemplary embodiment.

Referring to FIG. 5, the electronic device 100 may convert the reference signal and the microphone signal into a frequency domain respectively. In addition, the electronic device 100 may cancel a low frequency component by passing the reference signal which is converted into the frequency domain and the microphone signal respectively through a high pass filter. Since the low frequency component is a useless part in processing a voice, the electronic device 100 may use the high pass filter additionally in this stage.

A functional block expressed as sqrt( ) corresponds to the magnitude obtainer 135, and obtains the reference signal and a spectrum magnitude of the microphone signal. A functional block expressed as $e^{j\ atan}$ corresponds to the phase obtainer 136, and obtains a phase component of the microphone signal. RLS functional block corresponds to the first filter 131. It is called RLS functional block because the RLS functional block adapts a filter coefficient by using Recursive Least Squares (RLS) algorithm. RLS functional block may generate an estimated echo signal of the reference signal F(l,k) by using a spectrum magnitude of an input reference signal X(l,k) and an adaptive filter coefficient.

$$F(l,k) = \sum_{i=0}^{L-1} H_i(l,k) X(l-i,k)$$

In the above equation, L is a length of a filter.

Error signal E(l,k) corresponds to the value that the estimated echo signal of the reference signal is canceled from the microphone signal. The error signal may include a voice signal of a near-end speaker and a residual echo.

RES gain functional block corresponds to the second filter 133. The RES gain functional block may estimate a dispersion value of a residual echo by using the reference signal, the microphone signal, the estimated echo signal of the reference signal and the error signal. In addition, the RES gain functional block may generate an adaptive gain from a dispersion value of an estimated residual echo.

The electronic device 100 may multiply the generated the adaptive gain G(l,k) by the error signal E(l,k) and obtain only a voice signal of a near-end speaker in which a residual echo is canceled. In addition, the electronic device 100 may use the phase obtained from the microphone signal as a phase of the voice signal of the near-end speaker.

The electronic device 100 may generate an output signal by multiplying the adaptive gain G(l,k), the error signal E(l,k) and a phase of the microphone signal $e^{j\varphi d(l,k)}$, and converting the same into a time domain.

Figure 6:
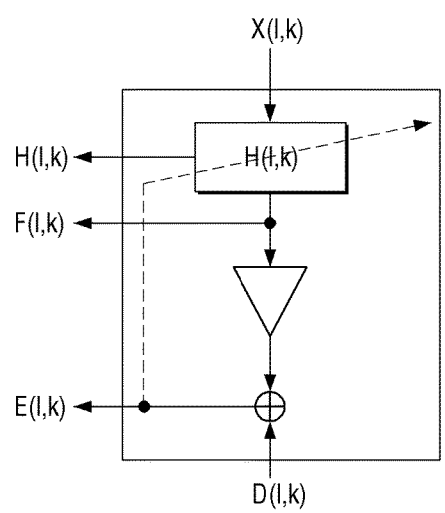
FIG. 6 is a drawing provided to explain a first filter of an electronic device according to an exemplary embodiment.

FIG. 6 is a drawing provided to explain the first filter 131 of the electronic device 100 according to an exemplary embodiment. FIG. 6 illustrates one of a plurality of adaptive filters comprising the first filter 131. In different frequency domains, the plurality of adaptive filters may trace echo signals of reference signals of the corresponding frequency domains.

Referring to FIG. 6, the first filter 131 may estimate an echo signal of an input reference signal X(l,k) by using a vector of the adaptive filter coefficients, H(l,k). In order to decrease the error signal E(l,k), the first filter 131 may provide a feedback on the error signal and update the adaptive filter coefficient. The error signal corresponds to the signal that the estimated echo signal F(l,k) is canceled from the microphone signal D(l,k). The error signal E(l,k) may be calculated as the following equations.

$$F(l,k) = \sum_i H_i(l,k) X(l-i,k)$$

$$E(l,k) = D(l,k) - F(l,k)$$

The first filter 131 may output the adaptive filter coefficient, the estimated echo signal and the error signal, so the second filter 131 may use the adaptive filter coefficient, the estimated echo signal and the error signal to cancel a residual echo.

Figure 7:
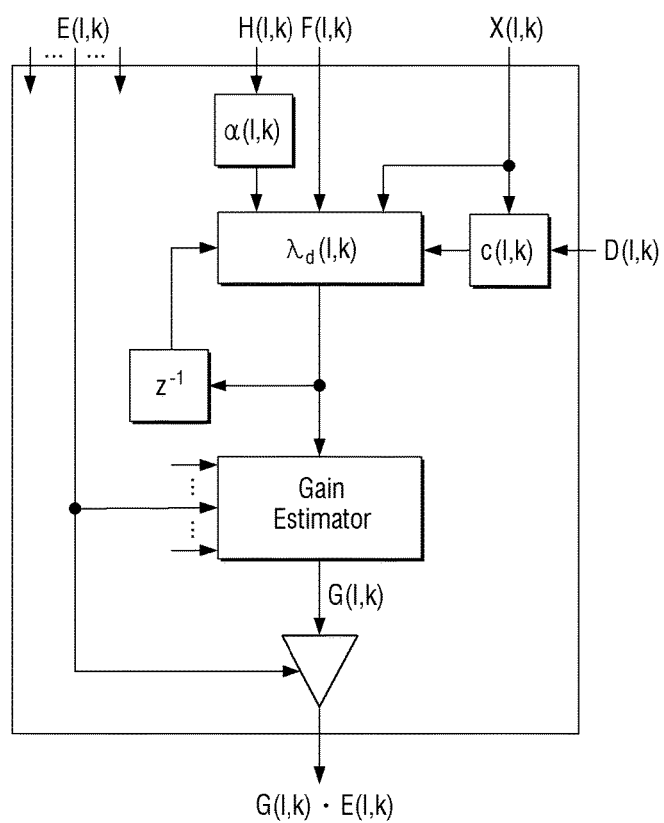
FIG. 7 is a drawing provided to explain a second filter of an electronic device according to an exemplary embodiment.

FIG. 7 is a drawing provided to explain the second filter 133 of an electronic device 100 according to an exemplary embodiment. The second filter 133 may generate the adaptive gain G(l,k) which is to be adapted to the microphone signal in which the estimated echo signal is canceled, in order to cancel a residual echo which remains in the microphone signal in which the estimated signal is canceled (that is, the error signal E(l,k)).

The second filter 133 may have to estimate a dispersion value of the residual echo first, in order to calculate the adaptive gain. According to an exemplary embodiment, the dispersion value of the residual echo may be calculated through information regarding an adaptive filter which reflects a reference signal and an acoustic environment.

The dispersion value of the residual echo $\lambda_d$, may be calculated through the following equation.

$$\lambda_d(l,k)=\alpha^2(l,k)\lambda_d(l-1,k)+(1-\alpha^2(l,k))\cdot|c(l,k)X^2(l,k)-F^2(l,k)|$$

In the above equation, $\alpha(l,k)$ is a decaying coefficient of the adaptive filter coefficient H(l,k), c(l,k) is a coupling coefficient between a reference signal and a microphone signal, X(l,k) is the reference signal, F(l,k) is an estimated echo signal of the reference signal, l is a frame index, and k is a frequency component index.

First, the second filter 133 may calculate the coupling coefficient between the reference signal and the microphone signal c(l,k) as the following equation.

$$c(l,k) \propto \frac{\langle D^2(l,k)\rangle}{\langle X^2(l,k)\rangle}$$

< > calculation corresponds to the calculation drawing a kind of an average by a frame unit.

After calculating the coupling coefficient c(l,k), the second filter 133 may calculate total energy of the reference signal $c(l,k)X^2(l,k)$ received in the microphone 120, by multiplying the coupling coefficient by a square of the reference signal. In addition, the second filter 133 may calculate a residual reference energy $c(l,k)X^2(l,k)-F^2(l,k)$ which remains in the error signal, by cancelling a square of the estimated echo signal $F^2(l,k)$ from the total energy of the reference energy.

The second filter 133 may reflect a residual echo energy of a previous frame by using a decaying coefficient of adaptive filter coefficient $\alpha(l,k)$.

The second filter 133 may calculate the decaying coefficient of adaptive filter coefficient $\alpha(l,k)$ by using the adaptive filter coefficient H(l,k). Components of the adaptive filter coefficient H(l,k) may be expressed as the following recursion on the assumption that the components decrease regularly.

$$|H_i(l,k)|=\alpha(l,k)|H_{i-1}(l,k)|$$

The second filter 133 may calculate the decaying coefficient by using a recursive relation as the following equation.

$$\alpha(l,k)=(|H_{min}(l,k)|/|H_{max}(l,k)|)^{1/(i_{min}-i_{max})}$$

In the above equation, $H_{min}$ is a minimum filter coefficient, $H_{max}$ is a maximum filter coefficient, and each of $i_{min}$ and $i_{max}$ are corresponding indexes.

The second filter 133 may generate the adaptive gain G(l,k) by using the dispersion value of the residual echo $\lambda_d$ and the error signal E(l,k). In addition, the second filter 133 may generate an output signal by multiplying the generated adaptive gain by the error signal.

The electronic device 100 may multiply the generated output signal by the phase of the microphone signal, convert the same into a time domain, and output the converted signal.

$$\hat{Y}(l,k)=G(l,k)E(l,k)e^{j\varphi_d(l,k)}$$

Figure 8:
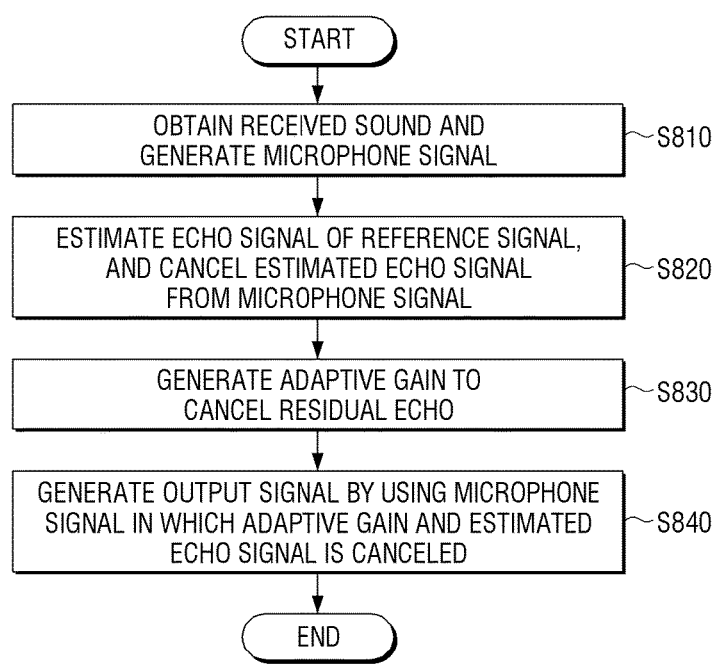
FIGS. 8 and 9 are flowcharts provided to explain an echo signal cancelling method of an electronic device according to diverse exemplary embodiments.

FIG. 8 is a flowchart provided to explain an echo signal cancelling method of the electronic device 100 according to an exemplary embodiment. Referring to FIG. 8, the electronic device 100 may generate a microphone signal by obtaining a received sound in S810. The microphone signal may include an echo signal of a reference signal output from the electronic device 100 itself, and the purpose of the echo signal cancelling method according to an exemplary embodiment is to cancel the echo signal of the reference signal.

The electronic device 100 may estimate the echo signal of the reference signal by using the adaptive filter, and cancel the estimated echo signal from the microphone signal in S820. However, in the microphone signal in which the estimated echo signal is canceled by using the adaptive filter, a residual echo remains, and thus the electronic device 100 may generate an adaptive gain to cancel the residual echo in S830. In addition, the electronic device 100 may generate an output signal by using the microphone signal in which the generated adaptive gain and the estimated echo signal are canceled, in S840.

Figure 9:
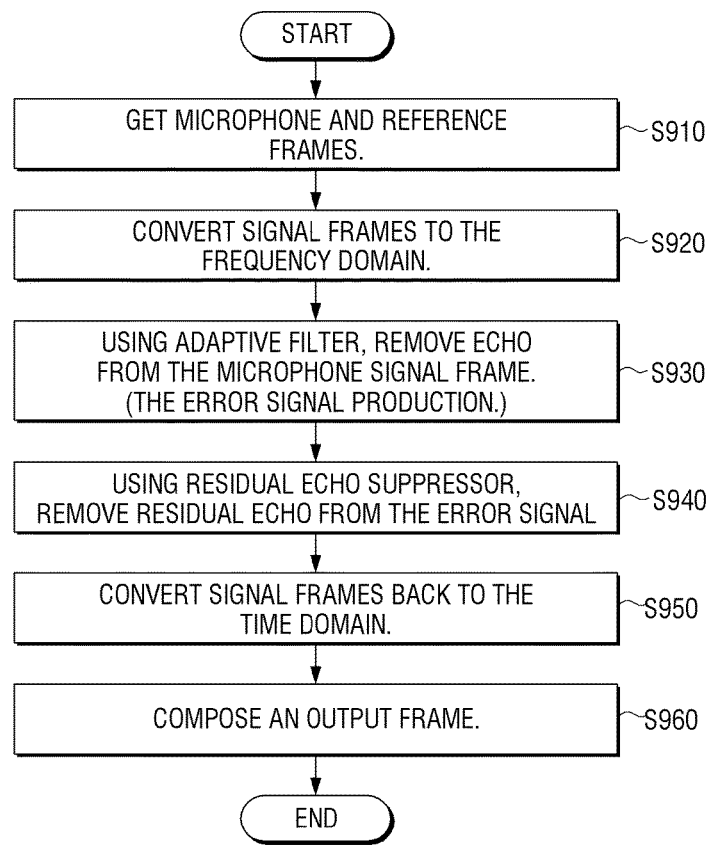

FIG. 9 is a flowchart provided to explain the echo signal cancelling method of the electronic device 100 according to an exemplary embodiment using other terms. Referring to FIG. 9, the electronic device 100 may obtain the microphone signal and the reference signal of a time domain in S910. The electronic device 100 may convert the microphone signal and the reference signal into a frequency domain in S920. The electronic device 100 may prevent a malfunction of the adaptive filter according to a confusion of the phase by converting the signals into the frequency domain. The electronic device 100 may cancel the echo signal from the microphone signal by using the adaptive filter in S930. In detail, the adaptive filter may estimate the echo signal of the reference signal, cancel the estimated echo signal from the microphone signal, and gain the error signal.

In order for the error signal, that is, the estimated echo signal to cancel the residual echo remains in the signal which is canceled from the microphone signal, the electronic device 100 may use a residual echo suppressor in S940. In detail, the residual echo suppressor may calculate the dispersion value of the residual echo from the information of the reference signal and the adaptive filter (acoustic environment), and calculate the adaptive gain to cancel the residual echo by using the calculated dispersion value of the residual echo.

Through the two stages of cancelling the echo signal, the electronic device 100 may obtain an output signal. In addition, the electronic device 100 may convert the output signal into the time domain again in S950. Successively, the electronic device 100 may output the output signal which is converted into the time domain, in S960.

The other exemplary embodiments of the echo signal cancelling method of the electronic device 100 are duplicated with the explanation of the electronic device 100, and thus will be omitted.

As described above, the electronic device 100 may cancel the echo signal in two stages. In addition, the electronic device 100 may obtain the adaptive gain value to cancel the residual echo effectively, by calculating the dispersion value of the residual echo by using the reference signal and the acoustic environmental information.

The above explained methods may be realized in a program instruction formation which can be performed through a variety of computer means and recorded in a computer readable medium. The above computer readable medium may include one of or a combination of a program instruction, a data file, and a data structure and the like. The program instruction recorded in the medium may be planned and composed especially for the exemplary embodiment, or well-known and usable for those skilled in a computer software. The computer readable recording medium may include the examples such as a hard disk, a floppy disk, a magnetic media such as a magnetic tape, an optical media such as CD-ROM and DVD, a magneto-optical media such as a floptical disk, and a hardware apparatus especially configured to store and execute a program instruction, such as ROM, RAM and flash memory. An example of the program instruction may include a machine cod formed by a compiler, as well as a high-level language code which can be executed by a computer using an interpreter. The above hardware apparatus may be composed to be operated as more than one software module to perform an operation of the exemplary embodiment, and so is the reverse thereof.

While the present disclosure has been shown and described with reference to various exemplary embodiments and drawings thereof, it will be understood by those skilled in the art that various changes in form and details may be made therein. Thus, the scope of the present disclosure should not be limited by the explained exemplary embodiments, and should be defined by the appended claims and their equivalents.

What is claimed is:

1. An electronic device comprising:
    a speaker configured to output a sound corresponding to a reference signal;
    a microphone configured to obtain a microphone signal by obtaining a received sound; and
    a filter configured to cancel an echo signal of the reference signal from the microphone signal,
    wherein the filter comprises:
        a first filter configured to estimate the echo signal of the reference signal and to cancel the estimated echo signal from the microphone signal, and
        a second filter configured to obtain an adaptive gain to cancel a residual echo from the microphone signal in which the estimated echo signal is canceled, and obtain an output signal based on the obtained adaptive gain and the microphone signal in which the estimated echo signal is canceled,
    wherein the filter is further configured to:
        divide each of the microphone signal and the reference signal into a magnitude and a phase respectively,
        obtain the output signal based on the magnitude of the microphone signal and the magnitude of the reference signal.

2. The electronic device as claimed in claim 1, wherein the filter is further configured to convert the microphone signal and the reference signal into a frequency domain, obtain the output signal by using the microphone signal and the reference signal, convert the obtained output signal into a time domain, and output the converted signal.

3. The electronic device as claimed in claim 2, wherein the filter is further configured to multiply a magnitude of the obtained output signal by the phase of the microphone signal.

4. The electronic device as claimed in claim 1, wherein the second filter is further configured to estimate a dispersion value of the residual echo and obtain an adaptive gain by using the estimated dispersion value and the microphone signal in which the estimated echo signal is canceled.

5. The electronic device as claimed in claim 4, wherein the dispersion value of the residual echo, $\lambda_d$, is estimated by $$\lambda_d(l,k)=\alpha^2(l,k)\lambda_d(l-1,k)+(1-\alpha^2(l,k))\cdot |c(l,k)X^2(l,k)-F^2(l,k)|$$

wherein $\alpha(l,k)$ is a decaying coefficient of an adaptive filter coefficient $H(l,k)$, $c(l,k)$ is a coupling coefficient between a reference signal and a microphone signal, $X(l,k)$ is a reference signal, $F(l,k)$ is an estimated echo signal of a reference signal, $l$ is a frame index, and k is a frequency component index.

6. The electronic device as claimed in claim 1, wherein the second filter is configured to obtain an adaptive gain by using one or more frequency components of the microphone signal in which the estimated echo signal is canceled.

7. The electronic device as claimed in claim 1, wherein the first filter comprises a plurality of adaptive filters configured to operate in different frequency bands.

8. The electronic device as claimed in claim 1, further comprising:
    a communicator configured to transmit the obtained output signal to an external device.

9. The electronic device as claimed in claim 1, further comprising:
    a voice recognizer configured to perform a voice recognition by using the obtained output signal and to obtain a control signal according to a result of the voice recognition.

10. An echo signal cancelling method of an electronic device comprising:
    obtaining a microphone signal by obtaining a sound received by the electronic device;
    estimating an echo signal of a reference signal which is output from the electronic device;
    cancelling the estimated echo signal from the microphone signal;
    obtaining an adaptive gain to cancel a residual echo from the microphone signal in which the estimated echo signal is canceled; and
    obtaining an output signal based on the obtained adaptive gain and the microphone signal in which the estimated echo signal is canceled,
    wherein the obtaining the output signal comprises dividing each of the microphone signal and the reference signal into a magnitude and a phase respectively, and obtaining the output signal of the reference based on the magnitude of the microphone signal and the magnitude of the reference signal.

11. The echo signal cancelling method as claimed in claim 10, wherein the obtaining the adaptive gain comprises estimating a dispersion value of the residual echo and obtaining an adaptive gain by using the estimated dispersion value and an error signal.

12. The echo signal cancelling method as claimed in claim 11, wherein the dispersion value of the residual echo, $\lambda_d$, is estimated by $$\lambda_d(l,k)=\alpha^2(l,k)\lambda_d(l-1,k)+(1-\alpha^2(l,k))\cdot |c(l,k)X^2(l,k)-F^2(l,k)|$$

wherein $\alpha(l,k)$ is a decaying coefficient of an adaptive filter coefficient $H(l,k)$, $c(l,k)$ is a coupling coefficient between a reference signal and a microphone signal, $X(l,k)$ is a reference signal, $F(l,k)$ is an estimated echo signal of a reference signal, $l$ is a frame index, and k is a frequency component index.

13. The echo signal cancelling method as claimed in claim 10, wherein the obtaining the adaptive gain comprises obtaining an adaptive gain by using one or more frequency components of the microphone signal in which the estimated echo signal is canceled.

14. The echo signal cancelling method as claimed in claim 10, further comprising:
    converting the microphone signal and the reference signal into a frequency domain; and
    dividing each of the microphone signal and the reference signal into a magnitude and a phase, wherein the cancelling the echo signal, the obtaining the adaptive gain, and the obtaining the output signal use the magnitude of the divided microphone signal and the magnitude of the divided reference signal, and wherein the obtaining the output signal further comprises multiplying the obtained output signal by the phase of the microphone signal, converting the obtained output signal into a time domain, and outputting the converted signal.

15. The echo signal cancelling method as claimed in claim 10, wherein the cancelling the estimated echo signal comprises estimating an echo signal by using a plurality of adaptive filters which operate in different frequency bands.

16. The echo signal cancelling method as claimed in claim 10, further comprising:

transmitting the obtained output signal to an external device.

17. The echo signal cancelling method as claimed in claim 10, further comprising:

performing a voice recognition by using the obtained output signal, and obtaining a control signal according to a result of the voice recognition.

18. A non-transitory computer readable recording medium comprising a program to execute an echo signal cancelling method of an electronic device, the method comprising:

obtaining a microphone signal by obtaining a sound received by the electronic device;

estimating an echo signal of a reference signal which is output from the electronic device;

cancelling the estimated echo signal from the microphone signal;

obtaining an adaptive gain to cancel a residual echo from the microphone signal in which the estimated echo signal is canceled; and obtaining an output signal based on the obtained adaptive gain and the microphone signal in which the estimated echo signal is canceled, wherein the obtaining the output signal comprises dividing each of the microphone signal and the reference signal into a magnitude and a phase respectively, and obtaining the output signal of the reference based on the magnitude of the microphone signal and the magnitude of the reference signal.

* * * * *